United States Patent
Choi et al.

(10) Patent No.: US 7,479,977 B2
(45) Date of Patent: Jan. 20, 2009

(54) IMAGE FORMING APPARATUS AND LASER SCANNING METHOD THEREOF

(75) Inventors: Bong-hwan Choi, Suwon-si (KR); Dong-hyup Shin, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 241 days.

(21) Appl. No.: 11/429,960

(22) Filed: May 9, 2006

(65) Prior Publication Data

US 2007/0002416 A1 Jan. 4, 2007

(30) Foreign Application Priority Data

Jun. 30, 2005 (KR) .................. 10-2005-0057819

(51) Int. Cl.
B41J 2/435 (2006.01)
B41J 2/47 (2006.01)

(52) U.S. Cl. ..................... 347/234; 347/248

(58) Field of Classification Search ......... 347/234–235, 347/239–240, 248, 251–254; 250/234

See application file for complete search history.

(56) References Cited

U.S. PATENT DOCUMENTS 6,504,147 B1 * 1/2003 Ito et al. ................ 250/234
7,277,111 B2 * 10/2007 Campbell et al. .......... 347/235
2004/0141051 A1 * 7/2004 Tsuruya ................... 347/239

FOREIGN PATENT DOCUMENTS

| JP | 2001-142016 | 5/2001 |
| JP | 2002-023087 | 1/2002 |
| JP | 2002-311360 | 10/2002 |
| JP | 2004-090472 | 3/2004 |
| KR | 2004-69959 | 8/2004 |

OTHER PUBLICATIONS

Office Action issued in Korean Patent Application No. 2005-57819 on Oct. 31, 2006.

* cited by examiner

*Primary Examiner*—Hai C Pham
(74) *Attorney, Agent, or Firm*—Stein, McEwen & Bui, LLP

(57) ABSTRACT

An image forming apparatus is provided with a laser scanning unit having at least two laser diodes to form an electrostatic latent image on a photosensitive body with laser beams emitted from the laser diodes; an engine driving unit having at least one driving motor to drive a plurality of built-in units; and a control unit arranged to control one of the laser scanning unit and the engine driving unit so as to adjust a process speed of the engine driving unit or a scan speed of the laser scanning unit with a certain rate depending on a selected resolution in order to enhance a resolution of an image.

18 Claims, 7 Drawing Sheets

IMAGE FORMING APPARATUS AND LASER SCANNING METHOD THEREOF

CROSS-REFERENCE TO RELATED APPLICATIONS

This application claims all benefits accruing under 35 U.S.C. § 119 from Korean Patent Application No. 2005-57819, filed Jun. 30, 2005, in the Korean Intellectual Property Office, the entire disclosure of which is incorporated by reference herein.

BACKGROUND OF THE INVENTION

1. Field of the Invention

The present invention relates to an image forming apparatus, and more particularly, relates to an image forming apparatus capable of enhancing the resolution of an image by controlling a scan or process speed of the image forming apparatus having a laser scanning unit (LSU) that uses double laser diodes (LDs), and a laser scanning method thereof.

2. Related Art

Recently, as consumers' desire for faster printing speed has been increased, an image forming apparatus, such as a printer, a facsimile machine, a photocopier and a multi-functional product, has widely employed a multi-beam scanning approach of scanning two lines at a time using double laser diodes (LDs), rather than a single beam scanning approach of scanning a single line using a single LD.

If a multi-beam scanning approach is utilized, as shown in FIG. 1, an image forming apparatus emits laser beams with double LDs, i.e., upper and lower LDs, and scans a horizontal scanning signal (Hsync) once on a surface of a photosensitive body, such as a photoconductive drum, two dotted lines are simultaneously formed on the surface of the photosensitive body as an electrostatic latent image.

Further, when the multi-beam scanning approach is utilized, the upper and the lower LDs are arranged to be vertically fixed to each other at a certain interval. These intervals between dots of a scan line (dotted line shown in FIG. 1) can be adjusted to be narrow or broad by controlling a correspondent signal of each of the LDs. However, the intervals between the scan lines cannot be adjusted by controlling a corresponding signal of each of the LDs.

Accordingly, the intervals between scan lines of laser beams emitted from the upper and the lower LDs, i.e., scan lines of a scanning signal (Sync) need to be narrow so as to improve a vertical resolution of an image.

If a single-beam scanning approach is utilized using a single LD, intervals between scan lines of a scanning signal (Sync) can be adjusted by controlling a scan speed of a laser beam emitted from a single LD on a surface of a photosensitive body or a process speed of an engine driving unit (EDU) of the image forming apparatus. On the other hands, if a multi-beam scanning approach is utilized using double LDs, there is produced superposition or interference between scanning signals by controlling a scan speed or a process speed, so that it is difficult to be implemented.

More specifically, FIG. 2 illustrates scan lines formed on a surface of a photosensitive body in the case that a scan speed of a laser scanning unit (LSU) is increased double or a process speed of an engine driving unit (EDU) is decreased ½ time to enhance a vertical resolution of an image when compared with those shown in FIG. 1. In this case, as shown in FIG. 2, scan lines of scanning signals (Sync) having image information different from each other, which are emitted from the upper and the lower LDs, are mixed up. As a result, a required high-resolution image cannot be obtained.

Accordingly, there is a need for a laser scanning method and an image forming apparatus capable of obtaining a required high-resolution image without superposition or interference between scan lines of scanning signals (Sync) even though a scan speed of a laser scanning unit (LSU) or a process speed of an engine driving unit (EDU) are changed to enhance a vertical resolution by narrowing intervals between scan lines of scanning signals (Sync).

SUMMARY OF THE INVENTION

Various aspects and example embodiments of the present invention provide an image forming apparatus capable of enhancing resolution by controlling a scan or process speed at a certain rate in a laser scanning unit using double laser diodes (LDs), and a laser scanning method thereof.

Additional aspects and/or advantages of the invention will be set forth in part in the description which follows and, in part, will be obvious from the description, or may be learned by practice of the invention.

In accordance with an aspect of the present invention, there is provided an image forming apparatus, comprising a laser scanning unit having at least two laser diodes to emit laser beams to form an electrostatic latent image on a photosensitive body; an engine driving unit having at least one driving motor to drive a plurality of built-in units so as to form an image on a printable medium with a certain process speed; and a control unit arranged to control one of the laser scanning unit and the engine driving unit to change one of a process speed of the engine driving unit and a scan speed of the laser scanning with a certain rate depending on a resolution selected from an external source when the laser scanning unit forms the electrostatic latent image on the photosensitive body.

According to an aspect of the present invention, the resolution selected from the external source is selected as a resolution corresponding to a magnification (K) for a basic resolution calculated with the following expression:

$$K = 2n+1 \text{ (wherein } n \text{ is a natural number).}$$

The control unit is configured to reduce a process speed of the engine driving unit as the same magnification as the magnification (K) for the basic resolution corresponding to the selected resolution when changing the process speed of the engine driving unit, and accelerate a scan speed of the laser scanning unit as the same magnification as the magnification (K) for the basic resolution corresponding to the selected resolution when changing the scan speed of the laser scanning unit.

In addition, the control unit is also configured to control laser beams containing image information not to be emitted from the laser diodes to the nth scan line (n is the natural number i.e., $n=(K-1)/2$ derived by the expression of the magnification (K) for the basic resolution corresponding to the selected resolution) from each of the top and the bottom ends of an image to be scanned.

In this case, there is not formed an image such as an electrostatic latent image to the nth scan line from each of the top and the bottom ends of an image to be scanned, so that each of the upper and the lower lengths of an image practically printed on a printable medium such as a paper by a developer unit or the like become shorter to the nth scan line from each of the top and the bottom ends of an image than that of an image printed with a basic resolution.

Thus, in order to correct this, the control unit is configured to control the laser beams to be emitted from the laser diodes advancing by a correction distance (D) calculated with the following expression in an initial scan of an image, and the laser beams to be emitted from the laser diodes lagging by the correction distance (D) calculated with the following expression in a last scan of the image:

$D=d\times(K-1)/2,$ wherein d is an interval between scan lines, and K is the magnification for the basic resolution corresponding to the selected resolution.

In accordance with another aspect of the present invention, there is provided a laser scanning method of an image forming apparatus, comprising determining a resolution selected from an external source; and forming an electrostatic latent image on a photosensitive body along scan lines in a sub scanning direction through at least two laser diodes, while controlling one of a process speed and a scan speed with a certain rate in accordance with the selected resolution.

The resolution of an image can be determined by determining a magnification (K) for a basic resolution corresponding to the selected resolution in accordance with resolution selection signals input from the outside.

The resolution is selected as a resolution corresponding to a magnification (K) for a basic resolution calculated with the following expression:

$K=2n+1$ (wherein n is a natural number).

During the formation of an electrostatic latent image, an operation of controlling one of the process speed and the scan speed can be executed to reduce a process speed as the same magnification as the magnification (K) for the determined basic resolution.

In addition, an operation of controlling one of the process speed and the scan speed is executed to accelerate a scan speed of the laser diodes as the same magnification as the magnification (K) for the determined basic resolution.

The formation of an electrostatic latent image can include controlling laser beams containing image information not to be emitted from the laser diodes to the nth scan line (n is the natural number, i.e., n=(K−1)/2 derived by the expression of the magnification (K) for the basic resolution corresponding to the selected resolution) from each of the top and the bottom ends of an image to be scanned.

During this process, the laser beams can be controlled so as to be emitted from the laser diodes advancing by a correction distance (D) calculated with the following expression in an initial scan of an image, and to be emitted from the laser diodes lagging by a correction distance (D) calculated with the following expression in a last scan of the image:

$D=d\times(K-1)/2$ wherein d is an interval between scan lines and K is the magnification for the basic resolution corresponding to the selected resolution.

In addition to the example embodiments and aspects as described above, further aspects and embodiments of the present invention will be apparent by reference to the drawings and by study of the following descriptions.

BRIEF DESCRIPTION OF THE DRAWINGS FIGURES

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

Figure 1:
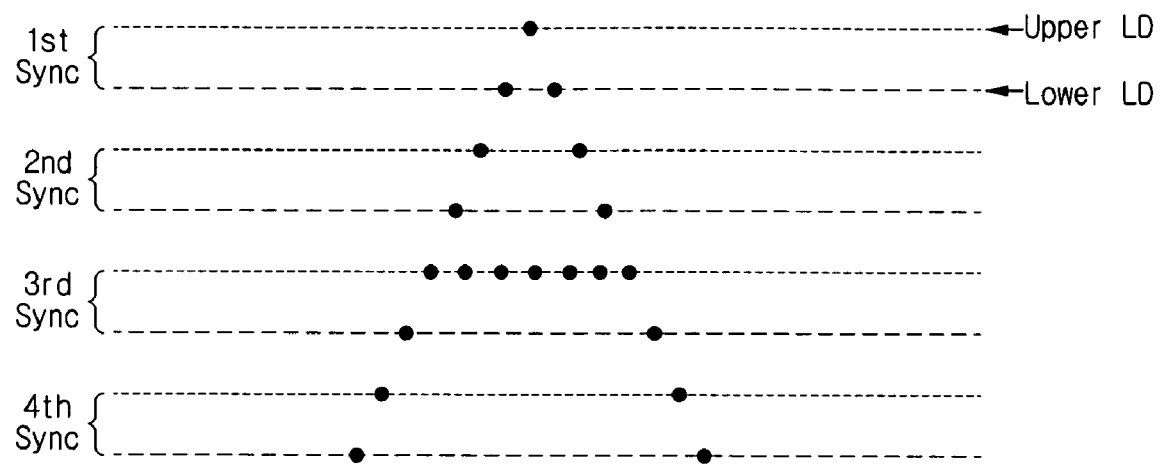
FIG. 1 is a view illustrating example scan lines formed on a surface of a photosensitive body by laser beams emitted from upper and lower laser diodes (LDs)
Figure 2:
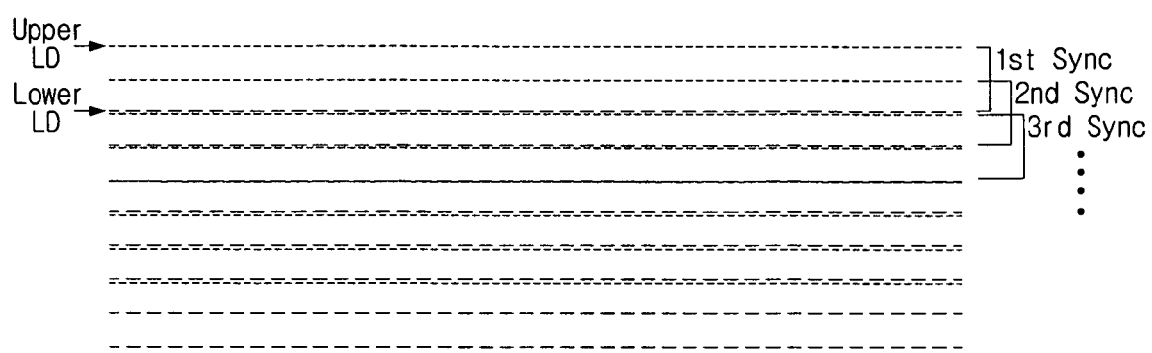
FIG. 2 is a view illustrating example scan lines formed on a surface of a photosensitive body in the case that a scan speed of a laser scanning unit (LSU) is increased double or a process speed of an engine driving unit (EDU) is decreased ½ time when compared with those shown in FIG. 1.
Figure 7:
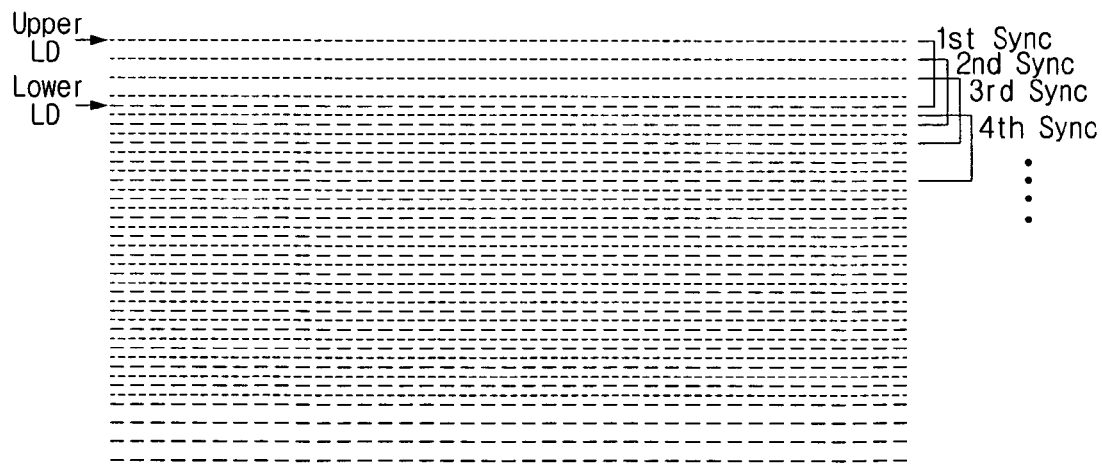
Figure 8:
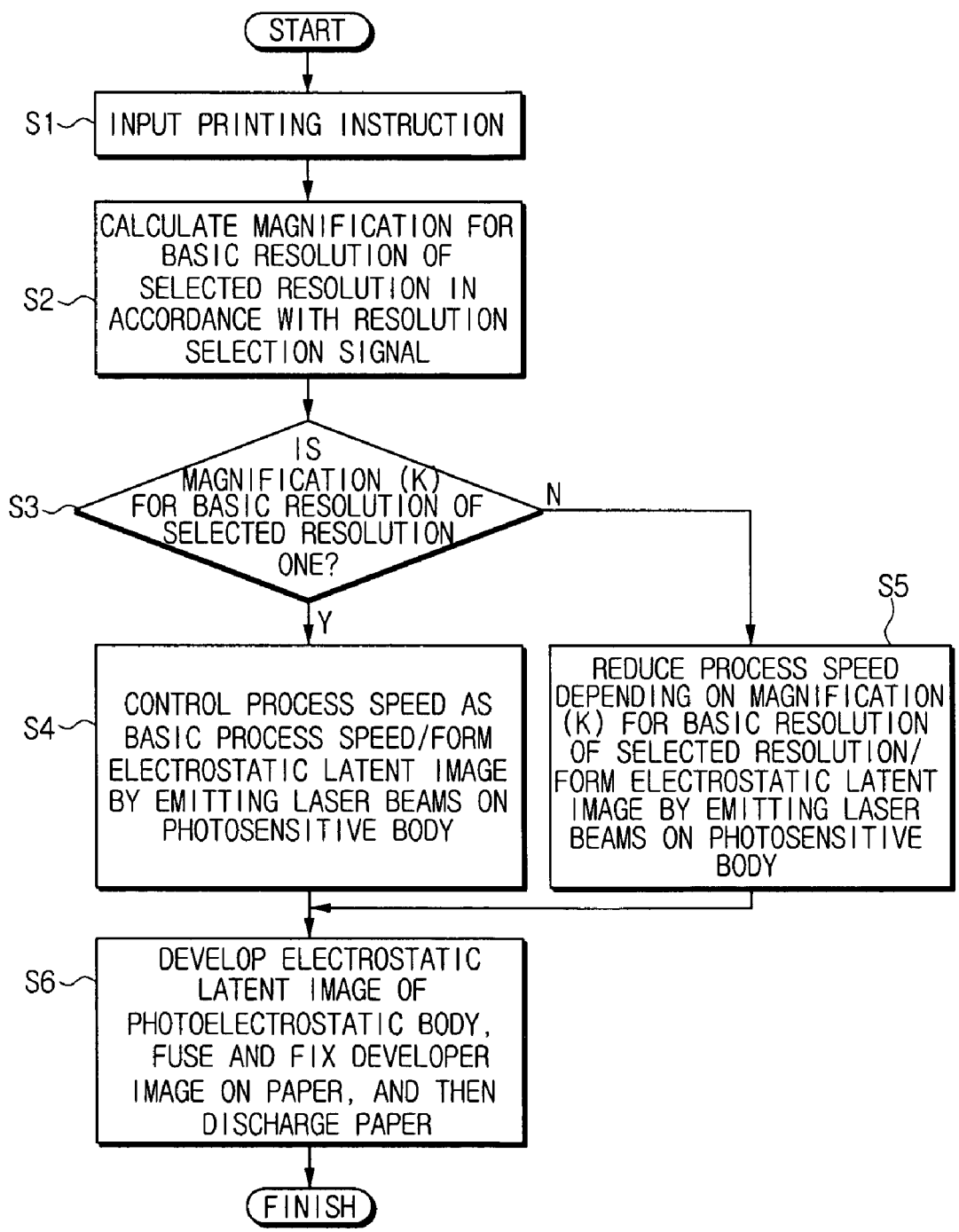

FIG. 7 is a view illustrating example scan lines formed on a surface of a photosensitive body when a scan speed of a laser scanning unit (LSU) is increased 7 times or a process speed of an engine driving unit (EDU) is decreased 1/7 time when compared with those shown in FIG. 1; and FIG. 8 is a flowchart illustrating a laser scanning method in an image forming apparatus according to an embodiment of the present invention.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
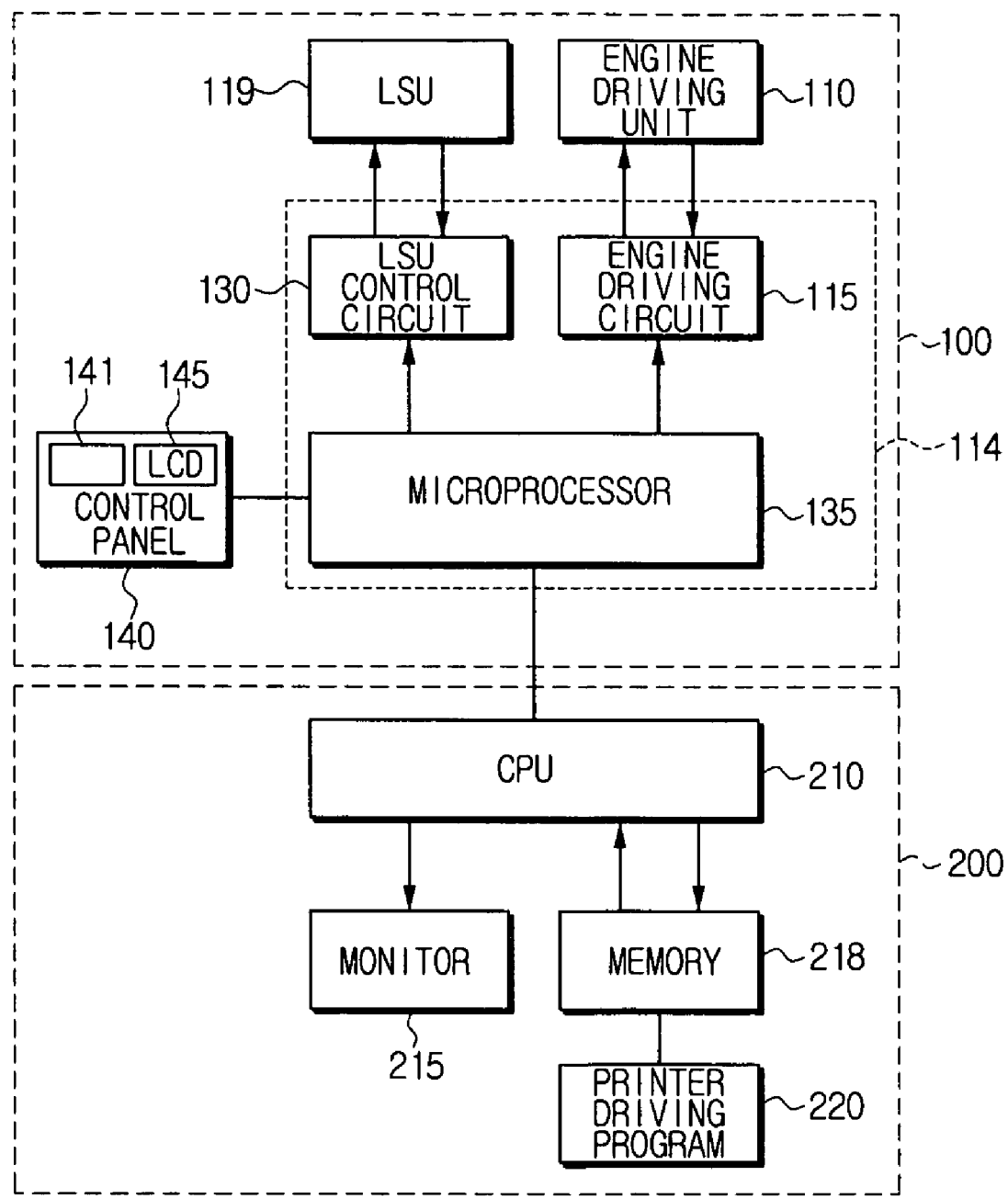
FIG. 3 is a block diagram of an example image forming apparatus according to an embodiment of the present invention.

FIG. 3 illustrates an example image forming apparatus according to an embodiment of the present invention. Such an image forming apparatus may correspond to a laser printer, a facsimile machine, a photocopier or a multi-functional product. However, for purposes of simplicity, the image forming apparatus according to an embodiment of the present invention is a laser printer 100. As shown in FIG. 3, the laser printer 100 comprises an engine driving unit (EDU) 110, a laser scanning unit (LSU) 119, a control unit 114, and a control panel 140.

Figure 4:
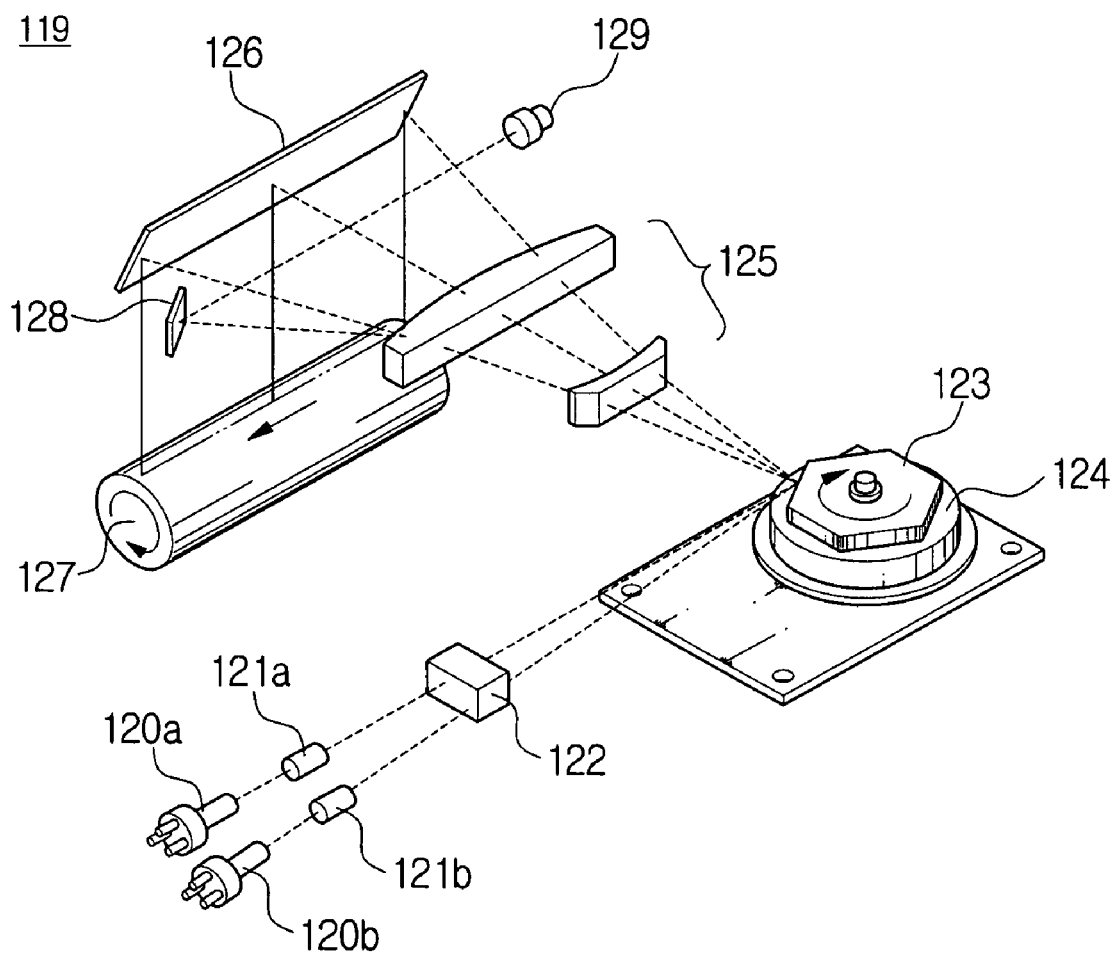
FIG. 4 is a schematic perspective view of an example laser scanning unit (LSU) of the image forming apparatus shown in FIG. 3.

The engine driving unit (EDU) 110 drives a conveying unit (not shown), a photosensitive body 127 (as shown in FIG. 4), a developer unit (not shown), a fusing unit (not shown), a discharging unit (not shown), and the like, and has at least one or more driving motors (not shown) for driving each of the units to progress printing at a certain process speed. The driving motor is connected to each of the units through a power transmitting gear train (not shown) and/or a power switching device (not shown). However a configuration of the driving motor, and the power transmitting gear train and/or the power switching device is generally known, their detailed descriptions will not be described herein.

The control unit 114 includes an engine driving circuit 115 for driving the engine driving unit (EDU) 110, a LSU control unit 130 for controlling the operation of the laser scanning unit (LSU) 119, and a microprocessor 135 for controlling the operation of the image forming apparatus, including a printing instruction from a user, via the control panel 140.

In addition to the control panel 140, a host computer 200 may be utilized to transmit a printing instruction from a user. Such a host computer 200 may include a CPU 210, a display monitor 215, a memory and a printer driving program 220, which allows the user to transmit a printing instruction to the laser printer 100 for printing an image on a printable medium.

Turning now to FIG. 4, a perspective view of a laser scanning unit (LSU) of an image forming apparatus according to an embodiment of the present invention is shown. As previously described, the laser scanning unit (LSU) 119 forms a electrostatic latent image on a photosensitive body 127 by emitting scanning signals (Sync) containing video data information therein, i.e., laser beams in accordance with video data signals input from an external device, such as a host computer 200, shown in FIG. 1.

As shown in FIG. 4, the laser scanning unit (LSU) 119 comprises upper and lower laser diodes (LDs) 120a and 120b, upper and lower collimator lenses 121a and 121b, a cylinder lens 122, a polygon mirror 123, a scanning motor 124, a F-theta (fθ) mirror 125, a horizontal synchronization mirror 128 and a synchronous signal detection sensor 129.

The upper and lower laser diodes (LDs) 120a and 120b are used as light sources to emit laser beams containing video data information therein. The upper and lower laser diodes (LDs) 120a and 120b are controlled based on control signals output from the LSU control unit 130.

The upper and lower collimator lenses 121a and 121b render the laser beams emitted from the upper and lower laser diodes (LDs) 120a and 120b into parallel beams with respect to an optical axis. The cylinder lens 122 makes the parallel beams emitted from the upper and lower collimator lenses 121a and 121b into linear beams parallel to a sub scanning direction.

The polygon mirror 123 then deflects the linear beams from the cylinder lens 122 while moving at a constant linear velocity, thus moving the beams at a constant linear velocity. The scanning motor 124 controlled by the LSU control circuit 130 rotates the polygon mirror 123 at the constant speed. The F-theta lens 125 has a fixed refractive index with respect to the optical axis, and refracts the laser beams which are reflected from the polygon mirror 123 at a fixed angle towards the main scanning direction. Further, the F-theta lens 125 adjusts the focus on a surface of the photosensitive body 127, which is a surface to be scanned, after correcting the aberration of the laser beams reflected from the polygon mirror 123. The reflection mirror 126 reflects the laser beams from the F-theta lens 125 in a certain direction so as to scan the beams on the surface of the photosensitive body 127.

The horizontal synchronization mirror 128 reflects the laser beam from the F-theta lens 125 in a horizontal direction to the synchronization signal detection sensor 129.

The synchronization signal detection sensor 129 receives the beam reflected from the horizontal synchronization mirror 128 and outputs a detection signal to the LSU control circuit 130. The detection signal from the synchronization signal detection sensor 129 is used for scanning synchronization of the upper and lower laser diodes (LDs) 120a and 120b.

Depending on a surface angle of the polygon mirror 123, the laser beams reflected at a certain angle from the polygon mirror 130 are incident on the surface of the photosensitive body 127 in the main scanning direction, thereby forming an electrostatic latent image on the surface of the photosensitive body 127. Multiple scan lines corresponding to the video data are also formed along the sub scanning direction, crossing at right angles with the main scanning direction while the photosensitive body 127 is being rotated.

At this time, the synchronization signal detection sensor 129 receives the beam reflected from the horizontal synchronization mirror 128 and outputs a detection signal to the LSU control circuit 130. Further, the LSU control circuit 130 adjusts horizontal synchronization of the upper and lower laser diodes (LDs) 120a and 120b. As a result, starting points of the scan lines are aligned, and thus, video images of scan lines having less deviation in starting points can be produced.

As previously discussed, the control unit 114 comprises an LSU control circuit 130, an engine driving circuit 115 and a microprocessor 135, which controls the LSU 119 and the engine driving unit 110.

The LSU control circuit 130 is electrically connected to the upper and the lower laser diodes (LDs) 120a and 120b, the scanning motor 124 and synchronization signal detection sensor 129. The LSU control circuit 130 controls operations of the upper and the lower laser diodes (LDs) 120a and 120b, and the scanning motor 124 in accordance with control signals of the microprocessor 135, and controls to align starting points of each scan line of the upper and the lower laser diodes (LDs) 120a and 120b in accordance with detection signals of the synchronization signal detection sensor 129.

The microprocessor 135 outputs a control signal to reduce a process speed of the engine driving unit (EDU) 110 at a certain rate in accordance with a resolution selection signal output from a CPU 210 of the host computer 200, as shown in FIG. 1, corresponding to a resolution selected through a printer driving program 220 stored in a memory 218 of the host computer 200, or an input button 141 of the control panel 140 selected by a user.

Alternately, the microprocessor 135 instructs the LSU control circuit 130 to output control signals for accelerating a scan speed of the upper and the lower laser diodes (LDs) 120a and 120b, instead of reducing a process speed of the engine driving unit (EDU) 110 to obtain the selected resolution.

The printer driving program 220 is provided with a first resolution selection window (not shown) for selecting a resolution through a monitor 215. The first resolution selection window has a plurality of first selection taps (not shown) for selecting plural resolutions corresponding to magnifications (K) for a basic resolution calculated by the following expression #1, via a mouse or a keyboard.

$$K=2n+1 \text{ (wherein n is a natural number.)} \quad (1).$$

The control panel 140 includes a liquid crystal display (LCD) 145 for displaying a second resolution selection window (not shown) selected through the input button 141. The second resolution window also has a plurality of second selection taps (not shown) for selecting plural resolutions corresponding to the magnifications (K) for a basic resolution calculated by the expression #1.

The following Table 1 shows examples of a resolution selected through the first and the second selection taps, a magnification (K) for a basic resolution of selected resolution, a natural number (n) and a process speed (page per minute; ppm) of the engine driving unit (EDU) 10. Such data is previously stored in an internal memory of the microprocessor 135.

TABLE 1

| | RESOLUTION | | | | |
|---|---|---|---|---|---|
| | 600 dpi | 1800 dpi | 3000 dpi | 4200 dpi | ... |
| N | Default | 1 | 2 | 3 | ... |
| K | 1 | 3 | 5 | 7 | ... |
| PROCESS SPEED | 18 ppm | 6 ppm | 5.6 ppm | 2.4 ppm | ... |

In the case of reducing a process speed of the engine driving unit (EDU) 110 to obtain a selected resolution, the microprocessor 135, as shown in TABLE 1, outputs a control signal for reducing the process speed as the same magnification as a magnification (K) for a basic resolution corresponding to the resolution selected through the first or the second selection taps to the engine driving circuit 115.

Also, in the case of accelerating a scan speed of the laser scanning unit (LSU) 119 to obtain a selected resolution, the microprocessor 135 outputs a control signal for accelerating a scan speed of the first and second laser diodes (LDs) 120a and 120b as the same magnification as a magnification (K) for a basic resolution corresponding to the selected resolution through the first or the second selection taps to the LSU control circuit 130.

Figure 5:
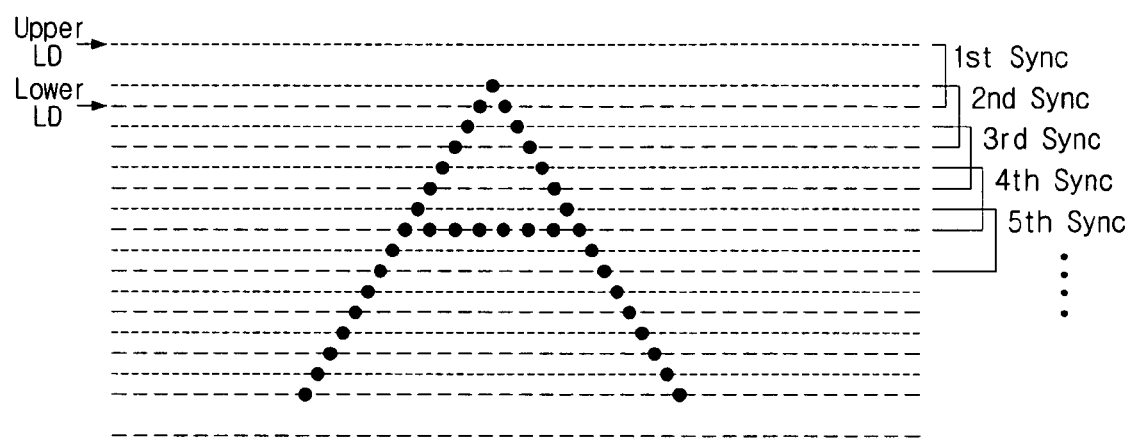
FIG. 5 is a view illustrating example scan lines formed on a surface of a photosensitive body when a scan speed of a laser scanning unit (LSU) is increased 3 times or a process speed of an engine driving unit (EDU) is decreased ⅓ time when compared with those shown in FIG. 1.

More specifically, FIG. 5 illustrates scan lines formed on a surface of the photosensitive body 127 by laser beams emitted from the upper and the lower laser diodes (LDs) 120a and 120b, i.e., a scanning signal (Sync) in the case that a scan speed of the laser scanning unit (LSU) 119 is increased three (3) times or a process speed of the engine driving unit (EDU) 110 is decreased ⅓ time than those shown in FIG. 1, which is an initial state for obtaining a basic resolution of one magnification. As is known from FIG. 5, the scan lines of the scanning signal (Sync) are not superposed or interfered to each other. That is, vertical resolution can be enhanced three (3) times than that shown in FIG. 1, because scan lines of a scanning signal are not mixed with each other.

Figure 6:
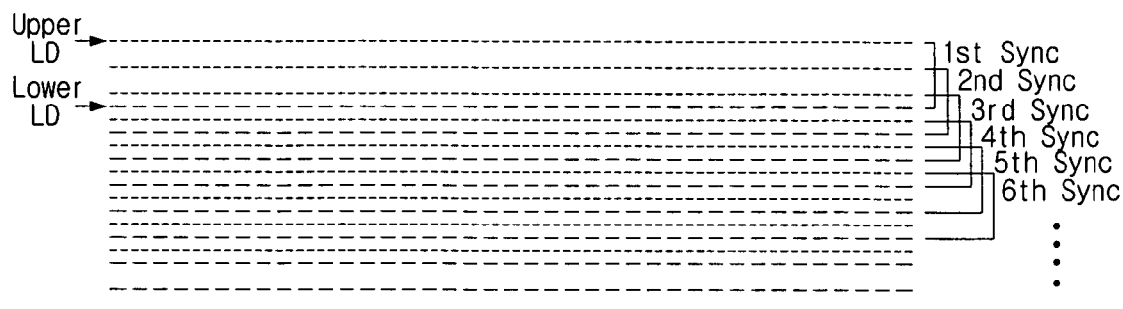
FIG. 6 is a view illustrating example scan lines formed on a surface of a photosensitive body when a scan speed of a laser scanning unit (LSU) is increased 5 times or a process speed of an engine driving unit (EDU) is decreased ⅕ time when compared with those shown in FIG. 1.

FIG. 6 illustrates scan lines formed on a surface of the photosensitive body 127 in the case that a scan speed of the laser scanning unit (LSU) 119 is increased five (5) times or a process speed of the engine driving unit 110 is decreased ⅕ time than those shown in FIG. 1. As is known from FIG. 6, the scan lines of the scanning signal (Sync) are not superposed or interfered to each other as the same case as FIG. 5, and the vertical resolution can be enhanced 5 times than that of FIG. 1.

FIG. 7 illustrates scan lines formed on a surface of the photosensitive body 127 in the case that a scan speed of the LSU 119 is increased seven (7) times or a process speed of the engine driving unit 110 is decreased ⅐ time than those shown in FIG. 1. As is known from FIG. 7, the scan lines of the scanning signal (Sync) are not superposed or interfered to each other as the same case as FIGS. 5 and 6, and the vertical resolution can be enhanced 7 times than that shown in FIG. 1.

As such, the vertical resolution of an image can be enhanced 3, 5 or 7 times than that of FIG. 1 by reducing a process speed of the engine driving unit (EDU) 110 as ⅓, ⅕ or ⅐ time, or accelerating a scan speed of the laser scanning unit (LSU) 119 as 3, 5, 7 times, respectively.

However, in this case, among scan lines of the first scanning signal (Sync), as shown in FIG. 5, the scan line of the scanning signal emitted from the upper laser diode (LD) 120a is separated at a certain interval from a scan line of the next scanning signal emitted from the upper laser diode (LD) 120a. In the same manner, among scan lines of the last scanning signal (Sync), the scan line of the scanning signal emitted from the lower laser diode (LD) 120b is separated at a certain interval from a scan line of the previous scanning signal emitted from the lower laser diode (LD) 120b. Thus, the top and the bottom ends of an image are not displayed with resolution required for the image, i.e., a 3-time enhanced resolution. Therefore, in order to display the entire image with a 3-time enhanced resolution, there should be contained no image information in the scan line of the scanning signal emitted from the upper laser diode (LD) 120a among scan lines of the first scanning signal (Sync) and the scan line of the scanning signal emitted from the lower laser diode (LD) 120b among scan lines of the last scanning signal (Sync). That is, the first information of an image to be displayed should be contained from the scan line of the second scanning signal (Sync) emitted from the upper laser diode (LD) 120a, and the last information of the image to be displayed should be contained in the scan line of the previous scanning signal (Sync) of the last scanning signal (Sync) emitted from the lower laser diode (LD) 120b.

Also, as shown in FIG. 6, in the case that a process speed of the engine driving unit (EDU) 110 is decreased ⅕ time or a scan speed of the laser scanning unit (LSU) 119 is increased 5 times, the number of scan lines containing no image information, i.e., no scanning signal (Sync) is increased by two for each of the upper and the lower ends of the image.

In the same manner, as shown in FIG. 7, in the case that a process speed of the engine driving unit (EDU) 110 is decreased ⅐ time or a scan speed of the laser scanning unit (LSU) 119 is increased 7 times, the number of scan lines containing no image information, i.e., no scanning signal (Sync) is increased by three for each of the upper and the lower ends of the image.

As such, as a process speed of the engine driving unit (EDU) 110 is decreased ⅓, ⅕, ⅐, ... time, or a scan speed of the laser scanning unit (LSU) 119 is increased 3, 5, 7, ... times, the number of scan lines containing no scanning signal (Sync) for each of the upper and the lower ends of the image is identical to the natural number (n) (=the following expression #2) derived by the expression #1:

$$N = (K-1)/2 \qquad (2).$$

That is, if a magnification (K) of resolution is 3, 5, 7, ... the number of scan lines containing no scanning signal (Sync) for each of the upper and the lower ends of the image is 1, 2, 3, ..., respectively.

Accordingly, as the number of scan lines containing no scanning signal (Sync) for each of the upper and the lower ends of the image is increased, the magnification (K) of resolution required to be displayed can infinitely be increased 3, 5, 7, ... times.

As such, in order to contain no scanning signal in a correspondent scan line, the correspondent laser diode (LD) 120a or 120b is controlled not to emit a scanning signal containing image information, i.e., a laser beam when scanning a scan line containing no scanning signal.

For this purpose, when the upper and the lower laser diodes (LDs) 120a and 120b forms an electrostatic latent image on a surface of the photosensitive body 127 along a scan line of the sub scanning direction, the microprocessor 135 output to the LSU control circuit 130 a control signal for controlling scanning signals (Sync), i.e., laser beams containing image information not to be scanned to the nth scan line (n is the natural number calculated by the expression 2) from each of the top and the bottom ends of an image to be scanned through the first and the second laser diodes (LDs) 120a and 120b.

However, in this case, there is not formed an image such as an electrostatic latent image on the surface of the photosensitive body 127 to the nth scan line (n is the natural number calculated by the expression 2) from each of the top and the bottom ends of an image to be scanned, so that each of the upper and the lower lengths of an image practically printed on paper by a developer unit (not shown) or the like become shorter to the nth scan line from each of the top and the bottom ends of an image than that of an image printed with a basic resolution of one magnification.

Thus, in order to correct this, it is preferred that at the upper end of an image, i.e., in the initial scanning, the microprocessor 135 controls laser beams containing image information to be emitted through the upper and the lower laser diodes (LDs) 120a and 120b advancing by a correction distance (D) calculated with the following expression 3 in consideration of a process speed of the engine driving unit 110, and at the bottom end of the image, i.e., in the last scanning, the microprocessor 135 controls laser beams containing image information to be emitted through the upper and the lower laser diodes (LDs) 120a and 120b lagging by a correction distance (D) calculated with the following expression #3:

$$D = d \times (K-1)/2 \quad (3)$$

wherein d is an interval between scan lines, and K is the magnification for a basic resolution of a selected resolution.

As described above, when forming an electrostatic latent image on the surface of the photosensitive body 127 by laser beams emitted from the upper and the lower laser diodes (LDs) 120a and 120b, the laser printer 100 according to an embodiment of the present invention does not use a separate software technique; rather, such a laser printer 100 can reduce a process speed of the engine driving unit (EDU) 110 or accelerate a scan speed of the laser scanning unit (LSU) 119, thereby generating no superposition between scan lines of scanning signals and executing laser scanning of an image with high resolution selected as magnifications except for one magnification.

In the light of the foregoing, although it is illustrated and described that an image forming apparatus according to an embodiment of the present invention is applied to a laser printer 100, the present invention is not limited to this, and it can be applied to another image forming apparatus, e.g., a copying machine or the like.

A laser scanning method of a laser printer 100 configured in this manner, according to an embodiment of the present invention, will fully be described below with reference to FIG. 8.

First, if a printing instruction is input, via a printer driving program 220 of a host computer 200, or a selection button 141 of a control panel 140 of a printer 100 at block S1, a microprocessor 135 calculates a magnification (K) for a basic resolution, e.g., a resolution of 600 dpi of an image to be printed from a resolution selection signal accompanied with the printing instruction, at block S2.

At this time, the resolution of an image to be printed is selected as a specific resolution through first or second selection taps of a first or a second selection window in the printer driving program 220 of the host computer 200, or a control panel 140 of the laser printer 100.

Subsequently, the microprocessor 135 determines whether or not the magnification (K) for the basic resolution of an image resolution to be printed is one ("1") at block S3.

As a result of block S3, if the magnification (K) for the basic resolution of an image resolution to be printed is one ("1"), the microprocessor 135 outputs video data signals to an LSU control unit 130 in accordance with video data input from a CPU 210 of the host computer 200, controlling a process speed of an engine driving unit (EDU) 110 as a basic process speed stored in an internal memory, e.g., a speed of 18 ppm, and thereby controls scanning signals (Sync) containing video data information, i.e., laser beams to be emitted from upper and lower laser diodes (LDs) 120a and 120b. The laser beams emitted from the upper and the lower laser diodes (LDs) 120a and 120b are incident on a surface of a photosensitive body 127, via upper and lower collimator lenses 121a and 121b, a cylinder lens 122, a polygon mirror 123 and an F-theta lens 125 in a main scanning direction, so that an electrostatic latent image is formed on the surface of the photoelectric body 127 at block S4.

At this time, assuming that the image resolution to be printed is selected as 1800 dpi, which is three (3) times the 600 dpi basic resolution, the microprocessors 135 determines that the magnification (K) for the basic resolution of the image resolution to be printed is not one ("1") at block S3.

As a result, the microprocessor 135 outputs a control signal to the engine driving circuit (EDU) 115 for reducing a process speed of an engine driving unit (EDU) 115 as 6 ppm, which is reduced as 3 times being identical to the magnification (K) for the basic resolution calculated or determined from a basic process speed, i.e., 18 ppm. Here, the microprocessor 135 can also output a control signal to the LSU control circuit 130 for accelerating a scan speed of a laser scanning unit (LSU) 119 as 3 times instead of reducing a process speed of the engine driving unit (EDU) 110 as ⅓ of a basic process speed.

At the same time, the microprocessor 135 outputs video data signals to the LSU control circuit 130 in accordance with video data input from the CPU 210 of the host computer 200, and thereby controls laser beams to be emitted from the upper and the lower laser diodes (LDs) 120a and 120b. The laser beams emitted from the upper and the lower laser diodes (LDs) 120a and 120b are incident on a surface of the photosensitive body 127, via the upper and the lower collimator lenses 121a and 121b, the cylinder lens 122, the polygon mirror 123 and the F-theta lens 125, so that an electrostatic latent image is formed on the surface of the photoelectric body 127. At this time, plural scan lines corresponding to the video data are formed along the sub scanning direction, crossing at right angles with the main scanning direction while the photosensitive body 127 is being rotated (S5).

Further, at this time, the microprocessor 135 calculates with the expression #2 a natural number (n) being the number of scan lines containing video data signals, i.e., scanning signal (Sync) not to be scanned from each of the top and the bottom ends of an image. Then, the microprocessor 135 outputs a control signal to the LSU control circuit 130 for controlling laser beams not to be emitted from the upper and the lower laser diodes (LDs) 120a and 120b during a period for scanning scan lines of the top and bottom ends of an image based on the calculated natural number (n=1).

Further, in order to correct upper and lower voids of an image produced due to the scan lines not to be scanned at the top and the bottom of the image, the microprocessor 135 outputs control signals to the LSU control circuit 130 for controlling laser beams to be emitted through the upper and the lower laser diodes (LDs) 120a and 120b advancing by a correction distance (D) calculated with the expression #3 at the upper end of an image, and for controlling laser beams lagging by the correction distance (D) calculated with the following expression #3 at the bottom end of the image in consideration of a process speed of the engine driving unit (EDU) 110.

As such, an electrostatic latent image formed on the photosensitive body 127 at blocks S4 and S5 is developed as a developer image in a visible shape form through a developer unit (not shown). The developer image is fused and fixed on a printable medium such as, paper, through a fusing unit (not shown) and a fixing unit (not shown), and the paper is then discharged to the outside of the laser printer 100 through a discharging unit (not shown).

As described above, when forming an electrostatic latent image on a surface of a photosensitive body by controlling laser beams to be emitted from upper and lower laser diodes LDs, an image forming apparatus and a laser scanning method thereof, according to an embodiment of the present invention, accelerates or reduces a scan speed of a laser scanning unit (LSU) or a process speed of an engine driving unit (EDU) with a certain rate in accordance with a selected resolution, so that intervals between scan line can be narrowed without superposition or interference between scanning signals of the scan lines, i.e., electrostatic latent images formed by the laser beams, thereby obtaining an image of the selected high resolution.

While the present invention has been particularly shown and described with reference to exemplary embodiments thereof, it will be understood by those of ordinary skill in the art that various changes in form and details may be made therein without departing from the spirit and scope of the present invention. For example, components of an image forming apparatus, as shown in FIG. 3, and a laser scanning unit (LSU), as shown in FIG. 4, can be arranged differently as long as a scan speed of a laser scanning unit (LSU) or a process speed of an engine driving unit (EDU) are controlled in accordance with a selected resolution, so that intervals between scan lines can be narrowed without superposition or interference according to the principles of the present invention. In addition, other laser sources may be used in lieu of the laser diodes (LDs) to emit laser beams. Similarly, the laser scanning unit control circuit and the engine driving circuit, as shown in FIG. 3, can be incorporated into existing components of the image forming apparatus, such as a system controller. Moreover, such a system controller can be implemented as a chipset having firmware, or alternatively, a general or special purposed computer programmed to implement methods as described with reference to FIG. 8. Accordingly, it is intended, therefore, that the present invention not be limited to the various example embodiments disclosed, but that the present invention includes all embodiments falling within the scope of the appended claims.

What is claimed is:

1. An image forming apparatus, comprising:
  a laser scanning unit having at least two laser sources to emit laser beams to form an electrostatic latent image on a photosensitive body;
  an engine driving unit having at least one driving motor to drive a plurality of built-in units so as to form an image on a printable medium with a certain process speed; and
  a control unit arranged to control one of the laser scanning unit and the engine driving unit to change one of a process speed of the engine driving unit and a scan speed of the laser scanning unit with a certain rate depending on a resolution selected when the laser scanning unit forms the electrostatic latent image on the photosensitive body,
  wherein the resolution selected is a resolution corresponding to a magnification (K) of a preset value or for a basic resolution calculated with the following expression:

$K=2n+1$ (wherein n is a natural number), and wherein the control unit controls the laser scanning unit such that laser beams containing image information are to be emitted from the laser diodes advancing by a correction distance (D) in an initial scan of an image, and laser beams containing image information are to be emitted from the laser diodes lagging by the correction distance (D) in a last scan of the image calculated with the following expression:

$D=d\times(K-1)/2$ wherein d is an interval between scan lines and K is the magnification for the basic resolution corresponding to the selected resolution.

2. The image forming apparatus as claimed in claim 1, wherein the control unit reduces a process speed of the engine driving unit as the same magnification as the magnification (K) for the basic resolution corresponding to the selected resolution of an image when changing the process speed of the engine driving unit, and accelerates a scan speed of the laser scanning unit as the same magnification as the magnification (K) for the basic resolution corresponding to the selected resolution of an image when changing the scan speed of the laser scanning unit.

3. The image forming apparatus as claimed in claim 2, wherein the control unit controls laser beams containing image information not to be emitted from the laser sources to the nth scan line (n is the natural number, i.e., n=(K−1)/2 derived by the expression of the magnification (K) for the basic resolution corresponding to the selected resolution of an image) from each of the top and the bottom ends of an image to be scanned.

4. The image forming apparatus as claimed in claim 1, wherein the laser sources are an upper laser diode and a lower laser diode arranged to emit laser beams onto the photosensitive body to form the electrostatic latent image thereon.

5. The image forming apparatus as claimed in claim 1, wherein the control unit is configured to:
  receive a printing instruction issued from a user, via one of a host computer and an operating panel;
  calculate a magnification for a basic resolution of an image to be printed from a resolution selection signal included in the printing instruction;
  determine if the magnification for the basic resolution of an image to be printed corresponds to a designated unit;
  when the magnification for the basic resolution of an image to be printed corresponds to the designated unit, control the process speed of the engine driving unit as a basic process speed for forming an electrostatic latent image on the photosensitive body and then an image on a printable medium; and
  when the magnification for the basic resolution of an image to be printed does not correspond to the designated unit, reduce the process speed of the engine driving unit depending on the magnification for forming the electrostatic latent image on the photosensitive body and then the image on the printable medium.

6. The image forming apparatus as claimed in claim 1, wherein the process speed of the engine driving unit and the scan speed of the laser scanning unit have an inverse relationship, such that, if the scan speed of the laser scanning unit is increased two (2) times, the process speed of the engine driving unit is decreased by ½ times to obtain a high resolution image.

7. A laser scanning method of an image forming apparatus, comprising:
  determining a resolution selected; and
  forming an electrostatic latent image on a photosensitive body along scan lines in a sub scanning direction through at least two laser diodes, while controlling one of a process speed and a scan speed with a certain rate in accordance with the selected resolution, wherein the selected resolution is selected from an external source as a resolution corresponding to a magnification (K) of a preset value or for a basic resolution calculated with the following expression:

$K=2n+1$ (wherein n is a natural number), and wherein, during the formation of the electrostatic latent image, laser beams containing image information are to be emitted from the laser diodes advancing by a correction distance (D) in an initial scan of an image and laser beams containing image information are to be emitted from the laser diodes lagging by the correction distance (D) in a last scan of the image calculated with the following expression:

$D=d\times(K-1)/2$ wherein d is an interval between scan lines and K is the magnification for the basic resolution corresponding to the selected resolution.

8. The method as claimed in claim 7, wherein the determining of a resolution comprises determining a magnification (K) for a basic resolution corresponding to the selected resolution in accordance with resolution selection signals input from an external source.

9. The method as claimed in claim 7, wherein, during the formation of an electrostatic latent image, an operation of controlling one of the process speed and the scan speed is executed to reduce a process speed as the same magnification as the magnification (K) for the determined basic resolution.

10. The method as claimed in claim 7, wherein, during the formation of an electrostatic latent image, an operation of controlling one of the process speed and the scan speed is executed to accelerate a scan speed of the laser diodes as the same magnification as the magnification (K) for the determined basic resolution.

11. The method as claimed in claim 7, wherein, during the formation of an electrostatic latent image, laser beams containing image information are not to be emitted from the laser diodes to the nth scan line (n is the natural number, i.e., n=(K−1)/2 derived by the expression of the magnification (K) for the basic resolution corresponding to the selected resolution) from each of the top and the bottom ends of an image to be scanned.

12. An image forming apparatus, comprising:
a laser scanning unit having at least two laser diodes to scan laser beams onto a photosensitive body in accordance with a scan speed so as to form an electrostatic latent image thereon;
an engine driving unit having at least one driving motor to drive internal units so as to form an image on a printable medium with a process speed; and
a control unit arranged to determine a resolution selected and control one of the process speed and the scan speed with a certain rate in accordance with the selected resolution for forming the electrostatic latent image on a photosensitive body and subsequently the image on the printable medium,
wherein the selected resolution is selected from an external source as a resolution corresponding to a magnification (K) of a preset value or for a basic resolution calculated with the following expression:

$K=2n+1$ (wherein n is a natural number), and wherein, during the formation of the electrostatic latent image, the control unit controls the laser scanning unit such that laser beams containing image information are to be emitted from the laser diodes advancing by a correction distance (D) in an initial scan of an image and laser beams containing image information are to be emitted from the laser diodes lagging by the correction distance (D) in a last scan of the image calculated with the following expression:

$D=d\times(K-1)/2$ wherein d is an interval between scan lines and K is the magnification for the basic resolution corresponding to the selected resolution.

13. The image forming apparatus as claimed in claim 12, wherein the control unit determines a magnification (K) for a basic resolution corresponding to the selected resolution of an image in accordance with resolution selection signals input from the external source.

14. The image forming apparatus as claimed in claim 12, wherein, during the formation of an electrostatic latent image, the control unit reduces the process speed as the same magnification as the magnification (K) for the determined basic resolution.

15. The image forming apparatus as claimed in claim 12, wherein, during the formation of an electrostatic latent image, the control unit accelerates the scan speed of the laser diodes as the same magnification as the magnification (K) for the determined basic resolution.

16. The image forming apparatus as claimed in claim 12, wherein, during the formation of an electrostatic latent image, the control unit controls the laser scanning unit such that laser beams containing image information are not to be emitted from the laser diodes to the nth scan line (n is the natural number, i.e., n=(K−1)/2 derived by the expression of the magnification (K) for the basic resolution corresponding to the selected resolution) from each of the top and the bottom ends of an image to be scanned.

17. The image forming apparatus as claimed in claim 12, wherein the control unit is configured to:
receive a printing instruction issued from a user, via one of a host computer and an operating panel;
calculate a magnification for a basic resolution of an image to be printed from a resolution selection signal included in the printing instruction;
determine if the magnification for the basic resolution of an image to be printed corresponds to a designated unit;
when the magnification for the basic resolution of an image to be printed corresponds to the designated unit, control the process speed of the engine driving unit as a basic process speed for forming an electrostatic latent image on the photosensitive body and then an image on a printable medium; and
when the magnification for the basic resolution of an image to be printed does not correspond to the designated unit, reduce the process speed of the engine driving unit depending on the magnification for forming the electrostatic latent image on the photosensitive body and then the image on the printable medium.

18. The image forming apparatus as claimed in claim 12, wherein the process speed of the engine driving unit and the scan speed of the laser scanning unit have an inverse relationship, such that, if the scan speed of the laser scanning unit is increased two (2) times, the process speed of the engine driving unit is decreased by ½ times to obtain a high resolution image.

* * * * *